(12) United States Patent
Cheong et al.

(10) Patent No.: US 12,028,164 B2
(45) Date of Patent: Jul. 2, 2024

(54) ELECTRONIC DEVICE FOR TRANSMITTING EIR PACKET IN BLUETOOTH NETWORK ENVIRONMENT, AND METHOD RELATED THERETO

(71) Applicant: SAMSUNG ELECTRONICS CO., LTD., Suwon-si (KR)

(72) Inventors: Gupil Cheong, Suwon-si (KR); Doosu Na, Suwon-si (KR); Jinhyung Park, Suwon-si (KR); Heejae Yoon, Suwon-si (KR); Sungjun Choi, Suwon-si (KR); Doosuk Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 403 days.

(21) Appl. No.: 17/503,673

(22) Filed: Oct. 18, 2021

(65) Prior Publication Data

US 2022/0038216 A1  Feb. 3, 2022

Related U.S. Application Data

(63) Continuation of application No. PCT/KR2020/004097, filed on Mar. 26, 2020.

(30) Foreign Application Priority Data

Apr. 19, 2019  (KR) .................. 10-2019-0046067

(51) Int. Cl.
*H04L 1/1812* (2023.01)
*H04B 1/713* (2011.01)
(Continued)

(52) U.S. Cl.
CPC .......... *H04L 1/1816* (2013.01); *H04B 1/713* (2013.01); *H04L 5/0055* (2013.01); *H04W 4/80* (2018.02); *H04W 8/005* (2013.01)

(58) Field of Classification Search
CPC ........ H04B 1/713; H04L 5/0055; H04W 4/80; H04W 8/005
See application file for complete search history.

(56) References Cited

U.S. PATENT DOCUMENTS 7,286,541 B2   10/2007   Koo
8,818,276 B2   8/2014    Kiukkonen et al.
(Continued)

FOREIGN PATENT DOCUMENTS

KR   2003-0050124   6/2003
KR   2013-0128347   11/2013
(Continued)

OTHER PUBLICATIONS

International Search Report for PCT/KR2020/004097 mailed Jul. 17, 2020, 4 pages.
(Continued)

*Primary Examiner* — Melanie Jagannathan
(74) *Attorney, Agent, or Firm* — Nixon & Vanderhye, P.C.

(57) ABSTRACT

An electronic device comprises: a wireless communication circuitry configured to support a Bluetooth protocol, wherein the wireless communication circuitry can be configured to: transmit an IAC-based ID packet for a communication connection with an external electronic device, receive, from the external electronic device, an FHS packet corresponding to the ID packet, identify whether an EIR field included in the FHS packet indicates the transmission of an EIR packet, identify whether a reserved field included in the FHS packet indicates the retransmission of the EIR packet based on the EIR field indicating the transmission of the EIR packet, receive the EIR packet from the external electronic device, and transmit, to the external electronic
(Continued)

device, an ACK signal for the reception of the EIR packet in response to the reception of the EIR packet.

14 Claims, 12 Drawing Sheets

(51) Int. Cl.
*H04L 5/00* (2006.01)
*H04W 4/80* (2018.01)
*H04W 8/00* (2009.01)

(56) References Cited

U.S. PATENT DOCUMENTS

| | | | |
|---|---|---|---|
| 8,929,816 B2 | 1/2015 | Palin et al. | |
| 8,929,817 B2 | 1/2015 | Palin et al. | |
| 10,045,190 B2 | 8/2018 | Lee | |
| 10,136,429 B2 | 11/2018 | Lee et al. | |
| 10,652,844 B1* | 5/2020 | De la Broise | H04L 1/1678 |
| 11,464,071 B2* | 10/2022 | Qian | H04W 8/005 |
| 2003/0036350 A1* | 2/2003 | Jonsson | H04W 48/20 |
| | | | 455/41.1 |
| 2004/0148426 A1* | 7/2004 | Hur | H04W 4/06 |
| | | | 709/236 |
| 2005/0118950 A1* | 6/2005 | Zechlin | H04B 1/7156 |
| | | | 370/310 |
| 2005/0180425 A1* | 8/2005 | Ruuska | H04W 28/18 |
| | | | 370/395.2 |
| 2007/0287418 A1* | 12/2007 | Reddy | H04W 12/50 |
| | | | 455/410 |
| 2009/0047991 A1* | 2/2009 | Elg | H04W 52/0293 |
| | | | 455/552.1 |
| 2012/0289157 A1 | 11/2012 | Palin et al. | |
| 2012/0289158 A1 | 11/2012 | Palin et al. | |
| 2012/0289159 A1 | 11/2012 | Palin et al. | |
| 2013/0109314 A1 | 5/2013 | Kneckt et al. | |
| 2013/0288600 A1* | 10/2013 | Kuusilinna | H02J 50/12 |
| | | | 455/41.2 |
| 2013/0309971 A1* | 11/2013 | Kiukkonen | H04W 12/50 |
| | | | 455/41.2 |
| 2013/0337748 A1* | 12/2013 | Reunamaki | H04W 8/005 |
| | | | 455/41.2 |
| 2014/0044276 A1* | 2/2014 | Hulvey | H04L 67/51 |
| | | | 381/77 |
| 2014/0160354 A1* | 6/2014 | Park | H04N 13/341 |
| | | | 348/564 |
| 2014/0195654 A1* | 7/2014 | Kiukkonen | H04W 8/00 |
| | | | 709/220 |
| 2014/0206290 A1 | 7/2014 | Lee | |
| 2015/0043427 A1 | 2/2015 | K.M. | |
| 2015/0373749 A1* | 12/2015 | Palin | H04W 76/10 |
| | | | 455/41.2 |
| 2016/0157078 A1* | 6/2016 | Palin | H04W 4/80 |
| | | | 455/41.2 |
| 2016/0278151 A1* | 9/2016 | Kwon | G08C 23/04 |
| 2017/0055255 A1* | 2/2017 | Zhou | H04L 5/0055 |
| 2017/0078836 A1* | 3/2017 | Song | H04W 8/005 |
| 2017/0201886 A1* | 7/2017 | Yang | H04W 12/06 |
| 2017/0223615 A1* | 8/2017 | Lee | H04W 36/03 |
| 2017/0251469 A1 | 8/2017 | Lee et al. | |
| 2017/0353979 A1* | 12/2017 | Lee | H04W 12/03 |
| 2022/0124643 A1* | 4/2022 | Wang | H04W 52/383 |

FOREIGN PATENT DOCUMENTS

| | | |
|---|---|---|
| WO | 02/39484 | 5/2002 |
| WO | 2016/003064 | 1/2016 |

OTHER PUBLICATIONS

Written Opinion of the ISA for PCT/KR2020/004097 mailed Jul. 17, 2020, 6 pages.

\* cited by examiner

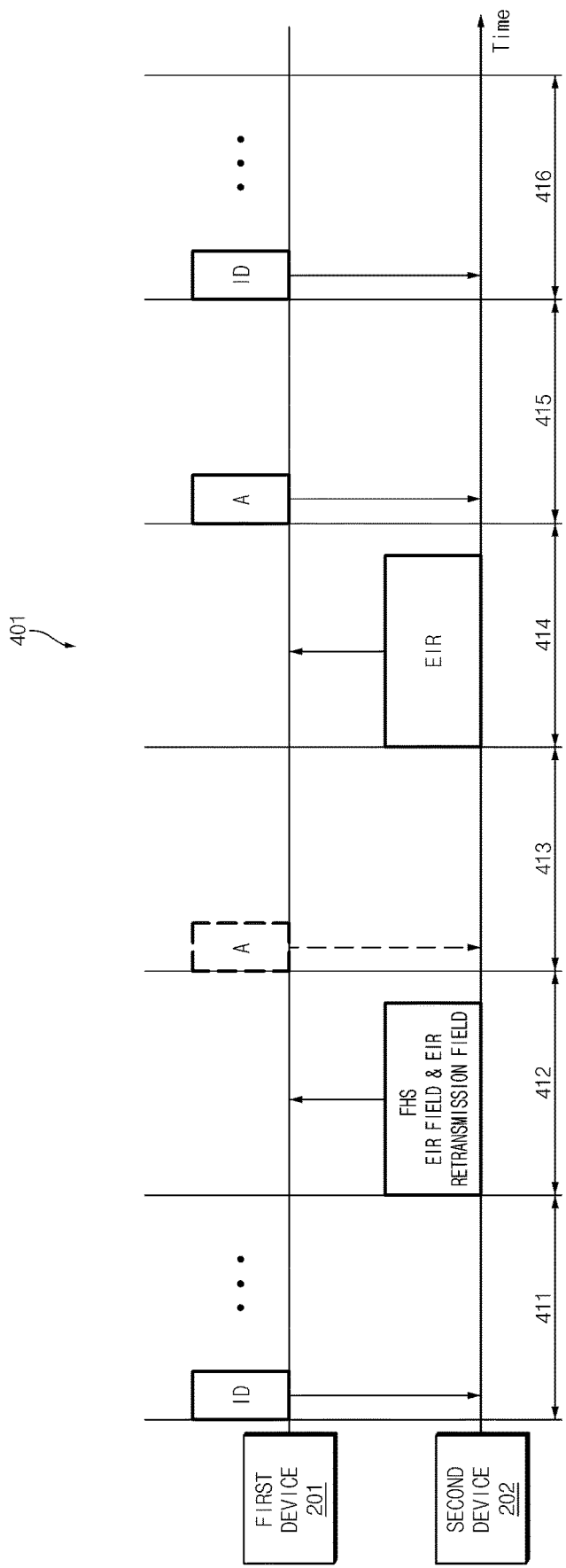

ELECTRONIC DEVICE FOR TRANSMITTING EIR PACKET IN BLUETOOTH NETWORK ENVIRONMENT, AND METHOD RELATED THERETO

CROSS-REFERENCE TO RELATED APPLICATIONS

This application is a continuation of International Application No. PCT/KR2020/004097 designating the United States, filed on Mar. 26, 2020, in the Korean Intellectual Property Receiving Office and claiming priority to Korean Patent Application No. 10-2019-0046067, filed on Apr. 19, 2019, in the Korean Intellectual Property Office, the disclosures of which are incorporated by reference herein in their entireties.

BACKGROUND

Field

The disclosure relates to an electronic device for transmitting an extended inquiry response (EIR) packet in a Bluetooth network environment and a method therefor.

Description of Related Art

A Bluetooth technology standard stipulated by the Bluetooth Special Interest Group (SIG) defines a protocol for short range wireless communication between electronic devices. In a Bluetooth network environment, electronic devices may transmit or receive, at a specified frequency band (e.g., about 2.4 gigahertz (GHz)), data packets including content such as text, voice, image, or video.

For example, user equipment (UE) such as a smartphone, tablet PC, desktop computer, or laptop computer may transmit data packets to another user equipment or accessory device. The accessory device may include, for example, at least one of an earphone, a headset, a wearable device, a speaker, a mouse, a keyboard, or a display device.

In a topology representing a Bluetooth network environment, before two or more electronic devices are connected, the electronic devices may inquire for counterpart devices and may exchange control information with discovered counterpart devices. For example, according to a Bluetooth standard, a first device (e.g., user equipment) which performs an inquiry may transmit an identification (ID) packet at a specified interval (e.g., two times per slot), and a second device (e.g., accessory device) which is performing an inquiry scan may transmit, to the first device, a frequency hop synchronization (FHS) packet and/or extended inquiry response (EIR) in response to reception of the ID packet. The FHS packet may include control information (e.g., clock information or address information) for connecting the first device and the second device. The EIR packet may include not only additional information for a connection but also data specified by a manufacturer.

The types of services (e.g., health care or hands-free call) that may be provided by a user equipment by being connected to an accessory device based on a Bluetooth protocol are increasing. The user equipment may provide a service linked to the accessory device based on data included in the EIR packet received from the accessory device. Therefore, if the EIR packet is unable to be received normally since a failure occurs in a wireless communication environment near electronic devices, the user equipment may not normally provide a user with a service that can be provided by the accessory device.

SUMMARY

Embodiments of the disclosure may provide an electronic device and a method for addressing the above-described limitation in a Bluetooth network environment.

An electronic device according to an example embodiment of the present disclosure may include: a wireless communication circuit configured to support a Bluetooth protocol, wherein the wireless communication circuit may be configured to: transmit an inquiry access code (IAC)-based identification (ID) packet for a communication connection with an external electronic device; receive a frequency hop synchronization (FHS) packet corresponding to the ID packet from the external electronic device; identify whether an extended inquiry response (EIR) field included in the FHS packet indicates transmission of an EIR packet; identify whether a reserved field included in the FHS packet indicates retransmission of the EIR packet based on the EIR field indicating transmission of the EIR packet; receive the EIR packet from the external electronic device; and transmit an acknowledgement (ACK) signal for reception of the EIR packet in response to reception of the EIR packet.

An electronic device according to an example embodiment of the present disclosure may include: a wireless communication circuit configured to support a Bluetooth protocol, wherein the wireless communication circuit may be configured to: perform an inquiry scan to scan for an external electronic device; receive an inquiry access code (IAC)-based identification (ID) packet from the external electronic device based on the inquiry scan; transmit, to the external electronic device, a frequency hop synchronization (FHS) packet including an extended inquiry response (EIR) field indicating transmission of an EIR packet and a reserved field indicating retransmission of the EIR packet; transmit the EIR packet to the external electronic device within a first time after transmitting the FHS packet; identify whether an acknowledgement (ACK) signal indicating reception of the EIR packet is received from the external electronic device within a second time after transmitting the EIR packet; and retransmit the EIR packet to the external electronic device based on the electronic device failing to receive the ACK signal within the second time.

An electronic device according to an example embodiment of the present disclosure may include: a wireless communication circuit configured to support a Bluetooth protocol, a processor operatively connected to the wireless communication circuit, and a memory operatively connected to the processor, wherein the memory may store instructions that, when executed, cause the processor to control the wireless communication circuit to: transmit an identification (ID) packet through the wireless communication circuit; receive a frequency hop synchronization (FHS) packet corresponding to the ID packet from an external electronic device; identify whether an EIR field included in the FHS packet indicates transmission of an EIR packet; identify whether an EIR retransmission field included in the FHS packet indicates retransmission of the EIR packet based on the EIR field indicating transmission of the EIR packet; attempt to receive the EIR packet transmitted from the external electronic device based on the EIR field indicating transmission of the EIR packet; and transmit an acknowledgement (ACK) signal responding to reception of the EIR packet based on the EIR retransmission field indicating retransmission of the EIR packet.

According to various example embodiments of the present disclosure, an electronic device may transmit or receive an EIR packet normally in a Bluetooth network environment.

Besides, various effects may be provided that are directly or indirectly identified through the present disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 4A is a diagram illustrating an example of EIR packet transmission operation according to various embodiments;

With respect to the description of the drawings, the same or similar reference signs may be used for the same or similar elements.

DETAILED DESCRIPTION

Hereinafter, various example embodiments of the disclosure will be described in greater detail with reference to the accompanying drawings. However, it should be understood that the disclosure is not limited to specific embodiments, but rather includes various modifications, equivalents and/or alternatives of various embodiments of the present disclosure.

Figure 1:
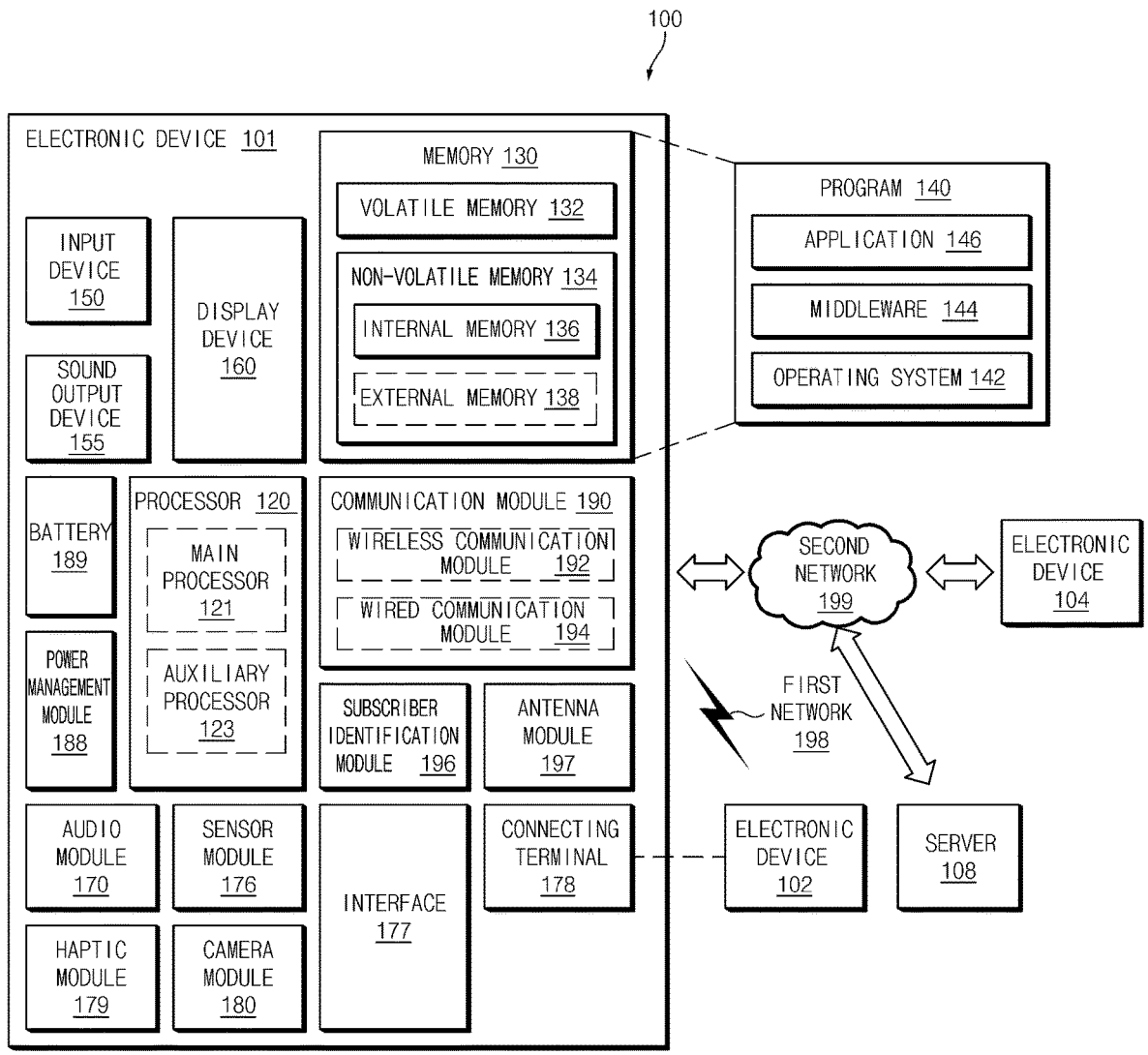
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
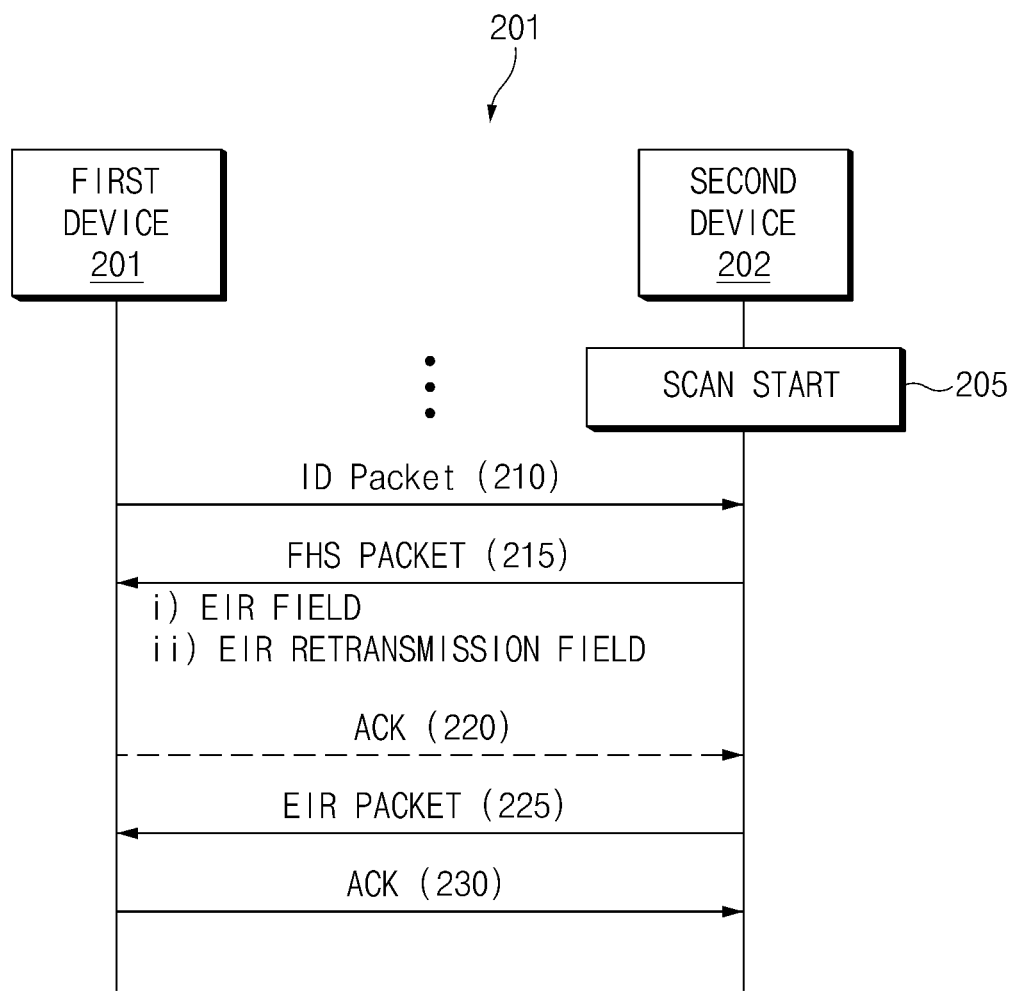
FIG. 2A is a signal flow diagram illustrating an example of retransmitting an EIR packet in a Bluetooth network environment according to various embodiments.
Figure 2B:
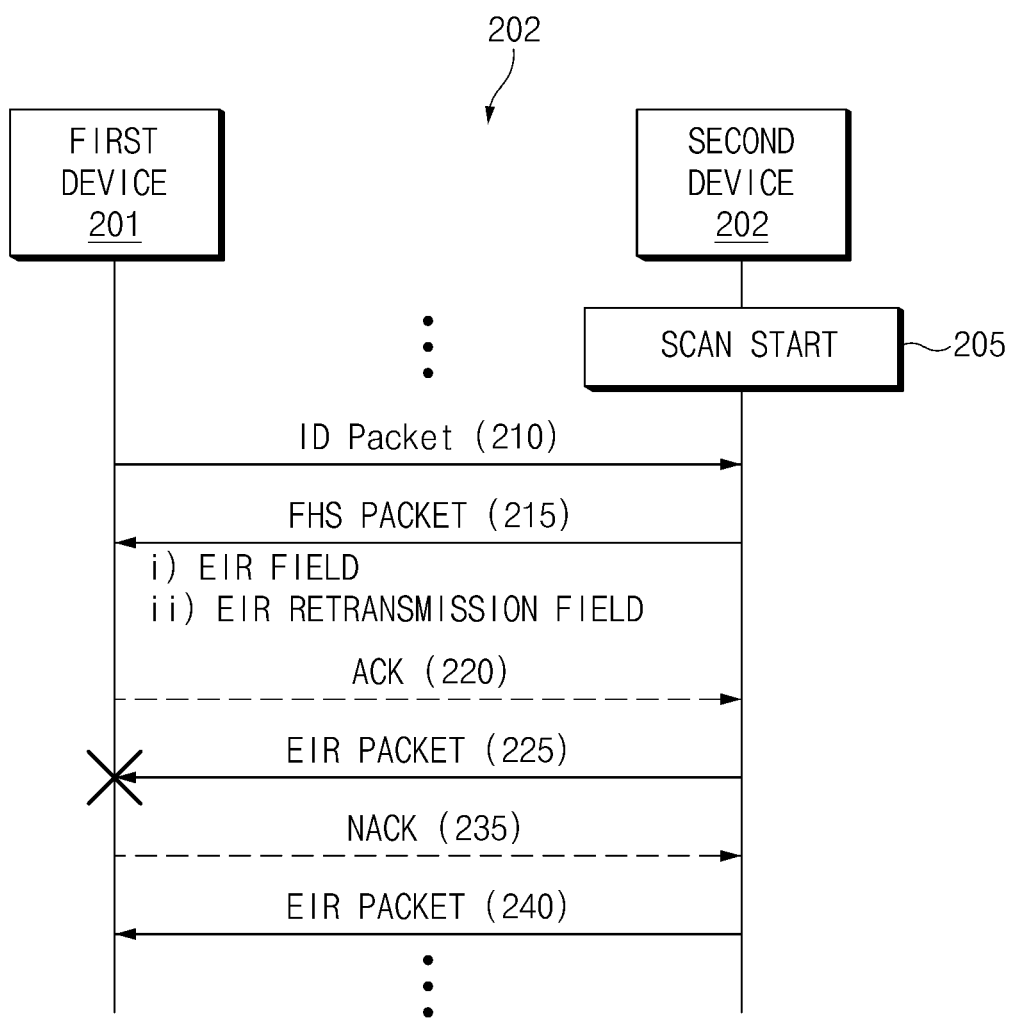
FIG. 2B is a signal flow diagram illustrating an example of retransmitting an EIR packet in a Bluetooth network environment according to various embodiments.

FIGS. 2A and 2B are signal flow diagrams 201 and 202 illustrating examples of retransmitting an EIR packet in a Bluetooth network environment according to various embodiments.

FIG. 2A illustrates an example in which an EIR packet is received normally by a first device 201, and FIG. 2B illustrates an example in which an EIR packet is not received normally by the first device 201. In the present disclosure, receiving normally an EIR packet may include not only the case where the EIR packet is received normally by the first device 201 through a wireless communication environment but also the case where the received EIR packet is processed (e.g., decoded) normally by the first device 201.

Referring to FIGS. 2A and 2B, the first device 201 and the second device 202 may include components, at least some of which are the same as or similar to those of the electronic device 101 illustrated in FIG. 1, and may execute functions, at least some of which are the same as or similar to those of the electronic device 101. The first device 201 and the second device 202, for example, may be a user equipment such as a smartphone, a tablet PC, a desktop computer, a laptop computer, or an accessory device such as an earphone, a headset, a speaker, a mouse, a keyboard, a wearable device, a display device, or the like, but is not limited thereto.

According to an embodiment, the first device 201 and the second device 202 may perform wireless communication at a short range according to a Bluetooth protocol defined by the Bluetooth SIG. The Bluetooth protocol may include, for example, a Bluetooth legacy protocol and a Bluetooth low energy (BLE) protocol. According to an embodiment, the first device 201 and the second device 202 may perform wireless communication through one or both of the Bluetooth legacy protocol and the BLE protocol.

According to the Bluetooth protocol, the first device 201 and the second device 202 may perform wireless communication at a specified frequency band (e.g., about 2.4 GHz). Since a frequency band of the Bluetooth protocol may overlap with a frequency band of another communication protocol (e.g., cellular communication protocol or wireless-fidelity (Wi-Fi) communication protocol), the first device 201 and the second device 202 may perform wireless communication while hopping a plurality of channels included in a specified frequency band at a specified interval (e.g., 1600 times per second). A plurality of channels (e.g., hopping channels) to be hopped by the first device 201 and the second device 202 may be determined based on a clock of the first device 201 or the second device 202. According to the Bluetooth protocol, a time resource (e.g., time slot) may be determined based on the clock of the first device 201 or the second device 202. 1 time slot may be, for example, 0.625 milliseconds (ms).

According to the Bluetooth protocol, the first device 201 and the second device 202 may transmit a packet including an access code for identification of a counterpart device or synchronization. The access code may be classified into a device access code (DAC), channel access code (CAC), and inquiry access code (IAC).

According to an embodiment, the first device 201 and the second device 202 may perform an inquiry procedure according to the signal flowchart 201 or 202 before the first device 201 and the second device 202 establish a link for transmitting a data packet including content such as text, voice, image, or video.

Referring to FIG. 2A, in order to inquire for an external electronic device (e.g., the second device 202), the first device 201 may transmit an ID packet including an IAC at a specified interval (e.g., two times per slot). According to an embodiment, the first device 201 may transmit the ID packet while changing a hopping channel.

In operation 205, the second device 202 may start a scan (or inquiry scan). For example, the second device 202 may open a receive (Rx) window at a specified interval in order to receive an IAC-based ID packet from an external electronic device (e.g., the first device 201).

In operation 210, the second device 202 may receive the ID packet transmitted from the first device 201 through a scan operation.

In response to reception of the ID packet, the second device 202 may transmit an FHS packet to the first device 201 in operation 215. The FHS packet may include information used to establish a link between the first device 201 and the second device 202. For example, the FHS packet may include address information (e.g., logical transport (LT) address) or clock information (e.g., CLK27-2) of the second device 202. According to an embodiment, the FHS packet may include an EIR field and EIR retransmission field.

According to an embodiment, the EIR field may indicate whether the second device 202 supports a function of transmitting an EIR packet. If the second device 202 is capable of transmitting an EIR packet, the EIR field may indicate that the second device 202 supports the function of transmitting an EIR packet. According to an embodiment, the EIR retransmission field may indicate whether the second device 202 supports a function of retransmitting an EIR packet. If the second device 202 is capable of retransmitting an EIR packet, the EIR retransmission field may indicate that the second device 202 supports the function of retransmitting an EIR packet.

Although not illustrated in FIGS. 2A and 2B, the first device 201 may end an inquiry procedure between the first device 201 and the second device 202 without attempting to receive an EIR packet if the EIR field indicates that the second device 202 does not support the function of transmitting an EIR packet. In this case, the first device 201 may, in response to a user input or automatically, perform a connection procedure that is based on the Bluetooth protocol with the second device 202 or may perform an inquiry procedure with an external electronic device other than the second device 202. If the first device 201 and the second device 202 perform a connection procedure without exchanging an EIR packet, the first device 201 may perform wireless communication with the second device 202 according to the Bluetooth protocol, but may be unable to perform some of services linked to the second device 202. For example, if the first device 201 is a user equipment (e.g., smartphone) and the second device 202 is an accessory device (e.g., smart watch or earphone), the first device 201 and the second device 202 may connect only a hands-free profile (HFP) and may be unable to connect a service profile.

Furthermore, although not illustrated in FIGS. 2A and 2B, the second device 202 may transmit an EIR packet one time if the EIR retransmission field indicates that the second device 202 does not support the function of retransmitting an EIR packet. In this case, the first device 201 and the second device 202 may end an inquiry procedure between the first device 201 and the second device 202 even if the first device 201 fails to receive an EIR packet normally.

In operation 220, the first device 201 may transmit an acknowledgement (ACK) signal for an FHS packet to the second device 202 in order to notify that the first device 201 is able to support the function of retransmitting an EIR packet. If the first device 201 is able to support the function of retransmitting an EIR packet, the first device 201 may transmit an ACK signal or negative ACK (NACK) signal indicating whether an EIR packet is received normally. According to an embodiment, the first device 201 may skip operation 220. For example, the first device 201 may skip operation 220 if the first device 201 does not support the function of retransmitting an EIR packet even if the second device 202 supports the function of retransmitting an EIR packet.

In operation 225, the second device 202 may transmit an EIR packet to the first device 201. The EIR packet may include at least one of a device name of the second device 202, a transmission power level, a service class universally unique identifiers (UUIDs), or manufacturer's data. The first device 201 may provide a service linked to the second device 202 to the user based on data included in the EIR packet. For example, if the first device 201 is a user equipment and the second device 202 is an accessory device, the EIR packet (e.g., manufacturer's data) may include screen configuration information or a user interface by which the user may connect, control, manage, or monitor the second device 202 via the first device 201. Furthermore, the EIR packet may include control information for a service profile connection between the first device 201 and the second device 202.

If the EIR packet is received normally by the first device 201, the first device 201 may transmit an ACK signal for the EIR packet to the second device 202 in operation 230. In response to normal reception of the EIR packet by the first device 201, the first device 201 and the second device 202 may end an inquiry procedure between the first device 201 and the second device 202. In this case, the first device 201 may, in response to a user input or automatically, perform a connection procedure that is based on the Bluetooth protocol with the second device 202 or may transmit an ID packet to inquire for an external electronic device other than the second device 202.

Referring to FIG. 2B, operations 205, 210, 215, 220 and 225 may respectively be the same as or similar to the operations included in the signal flowchart 201 of FIG. 2A and referred to by the same reference numbers.

In operation 225, the second device 202 may transmit an EIR packet, and the first device 201 may fail to normally receive the EIR packet sent from the second device 202. Since the first device 201 is aware that the second device 202 sends the EIR packet based on the FHS packet received from the second device 202, the first device 201, in operation 235, may not transmit an ACK signal or may transmit a NACK signal if the first device 201 fails to receive the EIR packet within a certain time.

In operation 240, the second device 202 may retransmit the EIR packet in response to reception of the NACK signal or failure of reception of the ACK signal within a specified time. According to an embodiment, the first device 201 and the second device 202 may repeatedly perform operations 235 and 240 until the EIR packet is received normally by the first device 201.

According to the above-mentioned method, the first device 201 may provide a service linked to the second device 202 to the user based on the EIR packet by more stably receiving the EIR packet.

Figure 3:
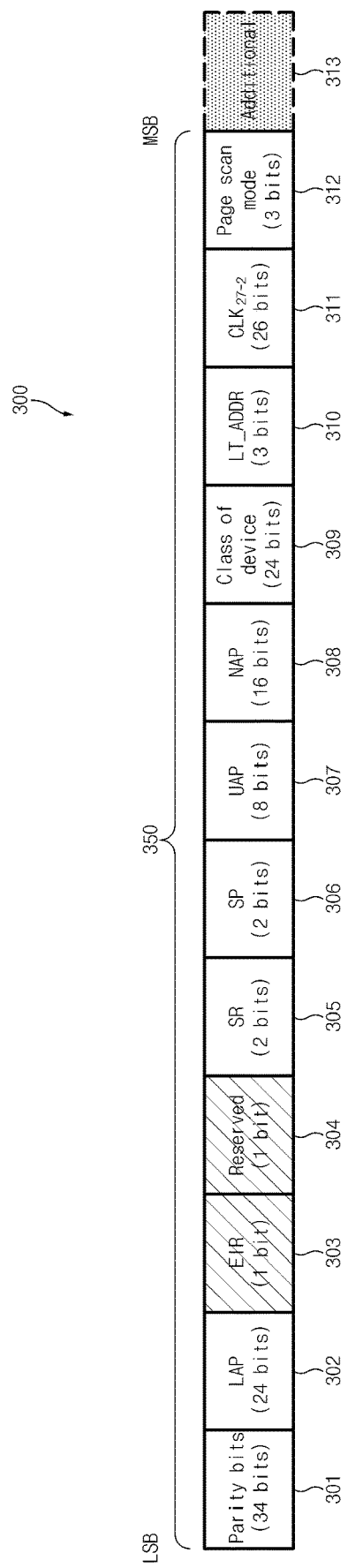
FIG. 3 is a diagram illustrating a data format of an FHS packet in a Bluetooth network environment according to various embodiments.

FIG. 3 is a diagram illustrating an example data format of an FHS packet 300 in a Bluetooth network environment according to various embodiments. The data format of the FHS packet 300 illustrated in FIG. 3 is merely an example, and at least one of the fields (e.g., 301 to 313) illustrated in FIG. 3 may be omitted.

Referring to FIG. 3, the data format of the FHS packet 300 may be a first data format 350 including a parity field 301 to a page scan mode field 312 or a second data format further including an additional field 313 in addition to the first data format 350.

At least a portion of the types and bits of the fields according to the first data format 350 may be based on a Bluetooth standard. For example, the FHS packet 300 may include the parity bit field 301 (e.g., 34 bits), a lower address part (LAP) field 302 (e.g., 24 bits), an EIR field 303 (e.g., 1 bit), a reserved field 304 (1 bit), a scan repetition (SR) field 305 (e.g., 2 bits), a scan period (SP) field 306 (e.g., 2 bits), an upper address part (UAP) field 307 (e.g., 8 bits), a non-significant address part (NAP) field 308 (e.g., 16 bits), a class-of-device field 309 (e.g., 24 bits), an LT address (LT_ADDR) field 310 (e.g., 34 bits), a CLK27-2 field 311 (e.g., 26 bits), and the page scan mode field 312 (e.g., 3 bits).

The parity bit field 301 may be positioned at a foremost portion of the FHS packet and may be used to detect an error. The EIR field 303 may indicate whether the second device 202 supports the function of transmitting an EIR packet. The reserved field 304 may represent a field not defined by a Bluetooth standard. The UAP field 307 and the NAP field 308 may indicate a code (e.g., organization unique identifier (OUI)) of a manufacturer, and the LAP field 302 may indicate a code allocated by a manufacturer. The SR field 305 may indicate an interval between continuous page scan windows. The SP field 306 may indicate a scan period. The class-of-device field 309 may indicate the class of the second device 202 (e.g., an earphone, a headset, a wearable device, a speaker, a mouse, a keyboard, or a display device). The LT address field 310 may indicate a logical transport address used for role switching or connection between the first device 201 and the second device 202. The CLK27-2 field 311 may indicate a value of a native clock of the second device 202. The page scan mode field 312 may indicate which scan mode is used by the second device 202.

According to an embodiment, the EIR retransmission field, which indicates whether the second device 202 supports the function of retransmitting an EIR packet, may be inserted into a position at which the reserved field 304 is inserted. In this case, the EIR retransmission field may be expressed by 1 bit.

According to an embodiment, if the FHS packet 300 includes the additional field 313 in addition to the fields (e.g., 301 to 312) according to the first data format 350, the EIR retransmission field may be included in the additional field 313.

Figure 4B:
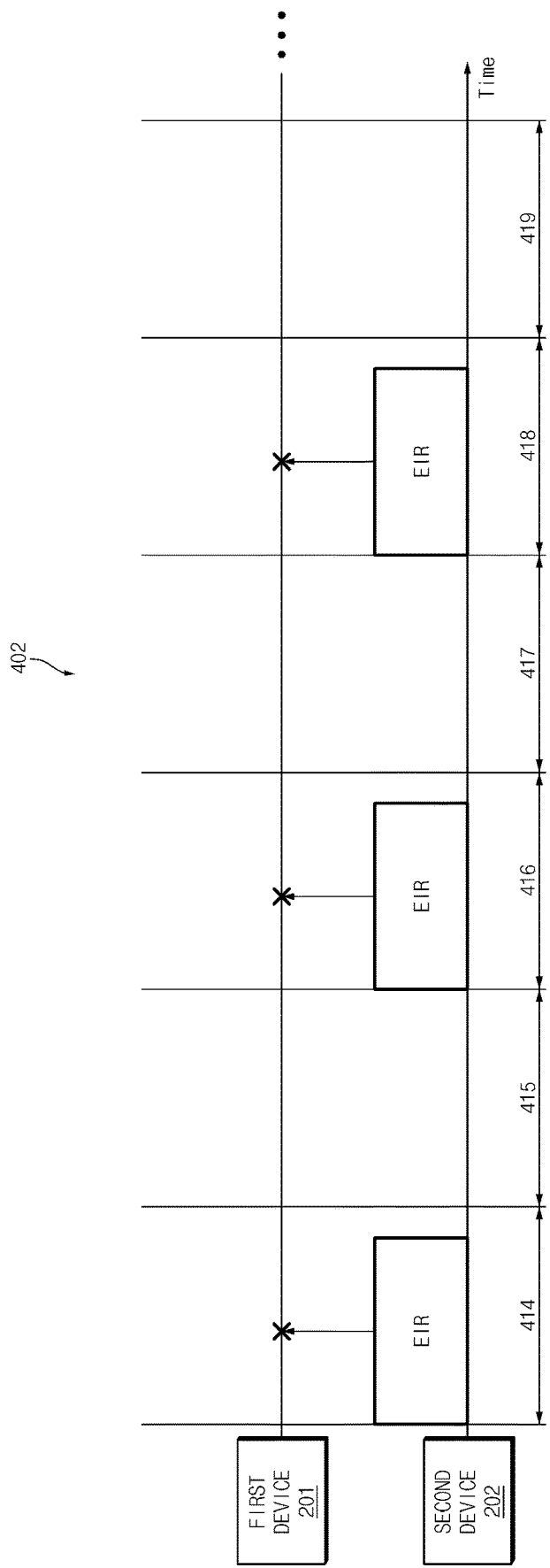
FIG. 4B is a diagram illustrating an example of EIR packet transmission operation according to various embodiments.
Figure 4C:
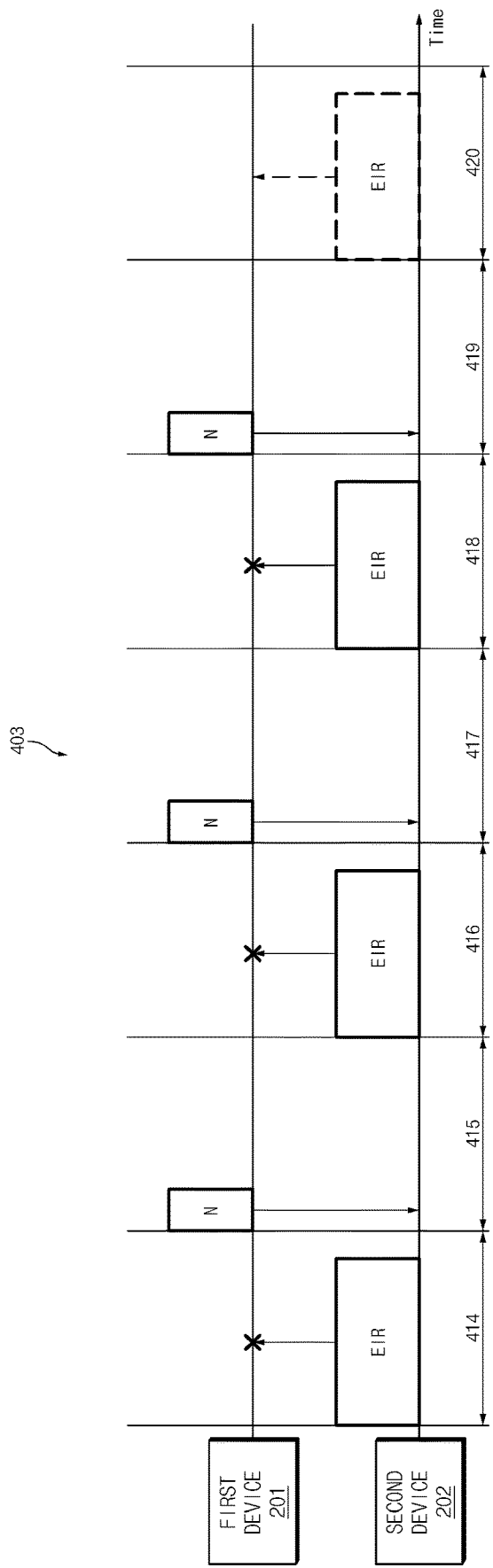
FIG. 4C is a diagram illustrating an example of EIR packet transmission according to various embodiments.

FIGS. 4A, 4B and 4C are diagrams illustrating examples of EIR packet transmission according to various embodiments.

Referring to FIGS. 4A, 4B and 4C, the horizontal axis may represent time in graphs 401, 402, and 403. Continuous time sections 411, 412, 413, 414, 415, 416, 417, 418, 419 and 420 (which may be referred to hereinafter as time sections 411 to 420) divided on the horizontal axis may represent time slots. 1 time slot may be, for example, 0.625 ms.

FIG. 4A illustrates an example operation in which the second device 202 transmits an EIR packet one time. In a first slot 411, the first device 201 may transmit an ID packet multiple times (e.g., two times). The ID packet, for example, may be based on IAC. If the second device 202 starts to scan in the first slot 411 (or a previous slot), the second device 202 may receive the ID packet transmitted from the first device 201. If the ID packet is received by the second device 202, the second device 202 may transmit an FHS packet to the first device 201 in a second slot 412. The FHS packet may include an EIR field and EIR retransmission field. For example, a data format of the FHS packet may be based on the first data format 350 or second data format of FIG. 3. If it is identified through the FHS packet that the second device 202 supports the function of transmitting an EIR packet and the function of retransmitting an EIR packet, the first device 201 may transmit an ACK signal for the FHS packet to the second device 202 in a third slot 413. According to an embodiment, the first device 201 may not transmit the ACK signal for the FHS packet. In a fourth slot 414, the second device 202 may transmit an EIR packet to the first device 201.

If the EIR packet is received normally by the first device 201, the first device 201 may transmit an ACK signal for the EIR packet to the second device 202, and the first device 201 and the second device 202 may end an inquiry procedure between the first device 201 and the second device 202 in a fifth slot 415. If the inquiry procedure between the first device 201 and the second device 202 is ended, the second device 202 may no longer transmit the EIR packet to the first device 201. If an inquiry time allocated to the first device 201 remains, the first device 201 may transmit an ID packet to inquire for an external electronic device other than the second device 202 during the remaining inquiry time. For example, the first device 201 may transmit the ID packet multiple times (e.g., two times) in a sixth slot 416.

Although not illustrated in FIG. 4A, if the EIR packet is received normally by the first device 201, the first device 201 may notify the user that the second device 202 is discovered. The first device 201 may perform a connection procedure with the second device 202 automatically or in response to a user input requesting a connection between the first device 201 and the second device 202. An example of a user interface showing that the second device 202 is discovered will be described with reference to FIG. 9.

FIG. 4B illustrates an example operation in which the second device 202 retransmits an EIR packet. The operation in the first slot 411 to the third slot 413 illustrated in the graph 401 of FIG. 4A may be referenced for the operation of exchanging the ID packet and the FHS packet between the first device 201 and the second device 202.

If the EIR packet transmitted from the second device 202 is not received normally by the first device 201 due to a wireless communication environment, the first device 201 may not transmit an ACK signal for the EIR packet. According to an embodiment, the first device 201 may transmit a NACK signal to the second device 202 in response to non-normal reception of the EIR packet. The first device 201 may not transmit the ACK signal or may repeatedly transmit the NACK signal until the EIR packet is received normally. For example, the first device 201 may not transmit a response signal in the fifth slot 415 if the EIR packet is not received normally in the fourth slot 414, and the first device 201 may not transmit the ACK signal in a seventh slot 417 if the EIR packet is not received normally in the sixth slot 416. In the same or similar manner, the first device 201 may not transmit the ACK signal in a ninth slot 429 if the EIR packet is not received normally in an eighth slot 418.

The second device 202 may retransmit the EIR packet if the ACK signal is not received or the NANC signal is received in a slot after a slot in which the EIR packet was transmitted. For example, the second device 202 may retransmit the EIR packet in the sixth slot 416 if the ACK signal is not received in the fifth slot 415 after transmitting the EIR packet in the fourth slot 414. In the same or similar manner, the second device 202 may retransmit the EIR packet in the eighth slot 418 if the ACK signal is not received in the seventh slot 417.

FIG. 4C illustrates an example operation in which the second device 202 retransmits an EIR packet within limited number of times (or limited time). The operation in the first slot 411 to the third slot 413 illustrated in the graph 401 of FIG. 4A may be referenced for the operation of exchanging the ID packet and the FHS packet between the first device 201 and the second device 202.

According to an embodiment, the first device 201 and the second device 202 may restrict the number of times the EIR packet is transmitted or a time during which the EIR packet is transmitted in order to inhibit an inquiry procedure from being delayed or inhibit power consumption of the devices 201 and 202 from increasing due to unlimited retransmission of the EIR packet. For example, a parameter that restricts the number of transmissions (or transmission time) of the EIR packet may be pre-stored in the first device 201 and the second device 202. For another example, the parameter that restricts the number of transmissions (or transmission time) of the EIR packet may be included in the FHS packet (e.g., the additional field 313 (see FIG. 3)) transmitted from the second device 202.

If the number of transmissions or transmission time of the EIR packet is restricted, the first device 201 and the second device 202 may end an inquiry procedure between the first device 201 and the second device 202 even if the EIR packet is not received normally by the first device 201. For example, the parameter that restricts the number of transmissions of the EIR packet is 3, the second device 202 may not transmit the EIR packet in a 10th slot 420 even if the EIR packet is not received normally by the first device 201 in the fourth slot 414, the sixth slot 416, and the eighth slot 418. According to an embodiment, when the first device 201 fails to receive the EIR packet within the number of transmissions (or transmission time) of the EIR packet, the inquiry procedure between the first device 201 and the second device 202 may be ended, and the first device 201 may provide only a limited service via the second device 202.

Figure 5:
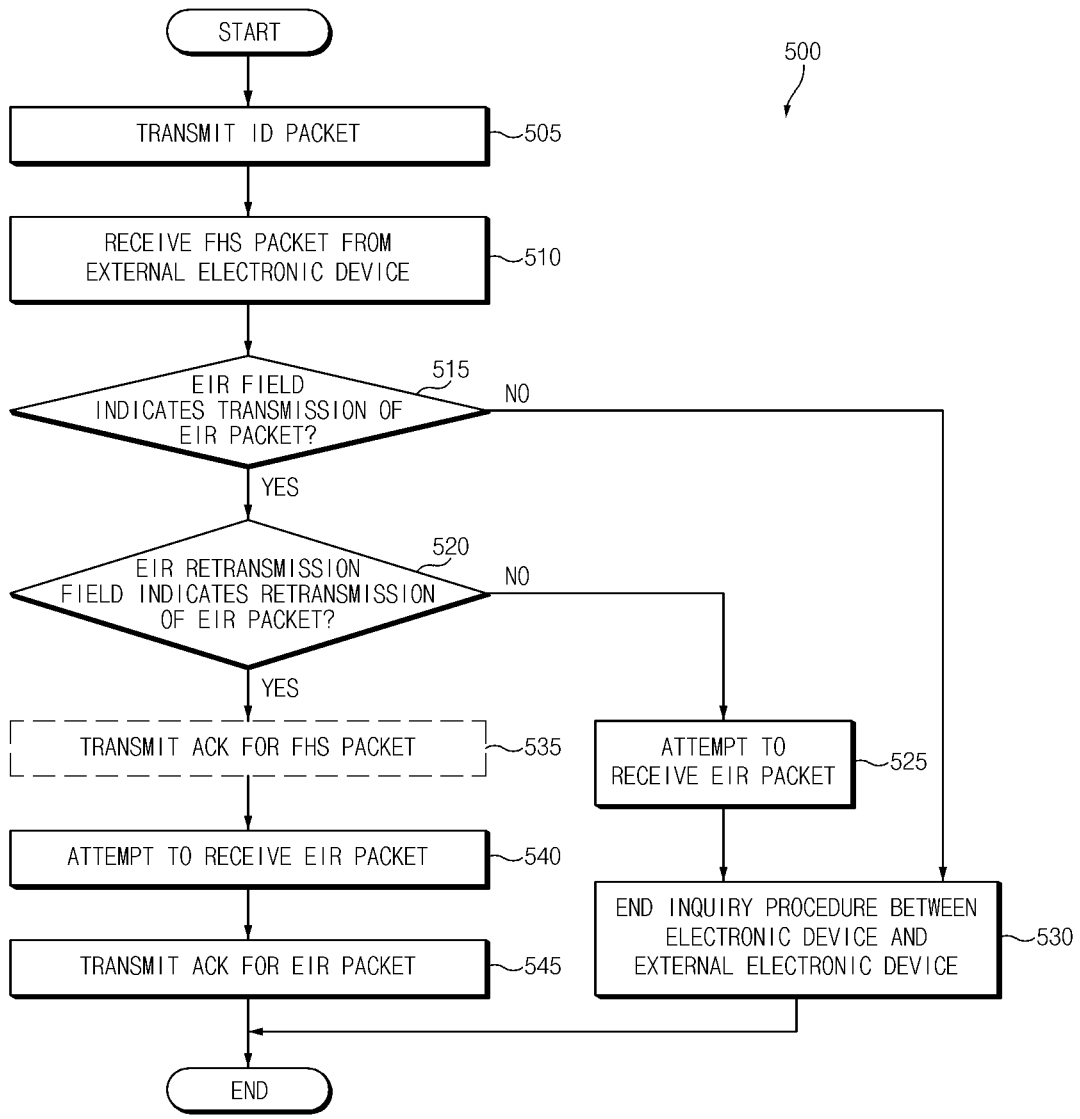
FIG. 5 is a flowchart illustrating an example operation of an electronic device which receives an EIR packet according to various embodiments.

FIG. 5 is a flowchart 500 illustrating an example operation of an electronic device which receives an EIR packet according to various embodiments. The operations illustrated in FIG. 5 may be performed by the first device 201 of FIG. 2. The operations illustrated in FIG. 5 may be performed by an electronic device or a component included in an electronic device. For example, a wireless communication circuit (e.g., at least a portion of the wireless communication module 192 of FIG. 1) included in an electronic device may perform the operations illustrated in FIG. 5.

Referring to FIG. 5, in operation 505, an electronic device may transmit an ID packet that is based on a Bluetooth protocol via a wireless communication circuit (e.g., at least a portion of the wireless communication module 192 of FIG. 1) in order to inquire for an external electronic device. The ID packet, for example, may include IAC. According to an embodiment, the electronic device may transmit the ID packet at a specified interval (e.g., two times per slot).

In operation 510, the electronic device may receive an FHS packet from an external electronic device (e.g., the second device 202 of FIG. 2) via the wireless communication circuit. The FHS packet may include, for example, an EIR field and EIR retransmission field.

In operation 515, the electronic device may identify whether the EIR field indicates transmission of an EIR packet through the wireless communication circuit. The EIR field indicating transmission of the EIR packet may represent that an external electronic device may transmit the EIR packet. The EIR field, for example, may be included in the FHS packet as 1-bit information.

If the EIR field does not indicate transmission of the EIR packet, the electronic device may end an inquiry procedure between the electronic device and an external electronic device in operation 530. For example, the electronic device may perform a connection procedure with the external electronic device, or may transmit an ID packet in order to further inquire for another external electronic device.

If the EIR field indicates transmission of the EIR packet, the electronic device may identify whether an EIR retransmission field indicates retransmission of the EIR packet through the wireless communication circuit in operation 520. The EIR retransmission field indicating retransmission of the EIR packet may represent that the external electronic device may retransmit the EIR packet. According to an embodiment, the EIR retransmission field may be inserted into a position at which a reserved field of the FHS packet is inserted. According to an embodiment, the EIR retransmission field may be included in an additional field (e.g., the additional field 313 of FIG. 3) additionally inserted in an FHS data format (e.g., the first data format 350 of FIG. 3) according to a Bluetooth standard.

If the EIR retransmission field does not indicate retransmission of the EIR packet, the electronic device may attempt to receive the EIR packet through the wireless communication circuit (operation 525), and may end an inquiry procedure between the electronic device and the external electronic device regardless of whether the EIR packet is received normally (operation 530).

Although not illustrated in FIG. 5, according to various embodiments, the electronic device may not support a function of receiving retransmission of the EIR packet even if the EIR retransmission field received from the external electronic device indicates retransmission of the EIR packet. In this case, the electronic device may attempt to receive the EIR packet through the wireless communication circuit (operation 525), and may end an inquiry procedure between the electronic device and the external electronic device regardless of whether the EIR packet is received normally (operation 530).

If the EIR retransmission field indicates retransmission of the EIR packet, the electronic device may transmit an ACK signal for the FHS packet to the external electronic device through the wireless communication circuit in order to notify that the function of retransmitting an EIR packet is supported, in operation 535. According to an embodiment, if information indicating that the electronic device supports the function of retransmitting an EIR packet is pre-stored in the external electronic device, the electronic device may perform operation 540 after operation 520 without performing operation 535.

In operation 540, the electronic device may attempt to receive the EIR packet transmitted from the external electronic device through the wireless communication circuit.

If the EIR packet is received normally, the electronic device may transmit an ACK signal for the EIR packet to the external electronic device in operation 545 in order to notify that that EIR packet is received normally.

Although the flowchart 500 illustrates an example operation in which the EIR packet is received normally by the electronic device, the electronic device may further perform another operation based on whether the EIR packet is received normally. An example in which the electronic device performs another operation based on whether the EIR packet is received normally will be described in greater detail below with reference to FIG. 6.

Figure 6:
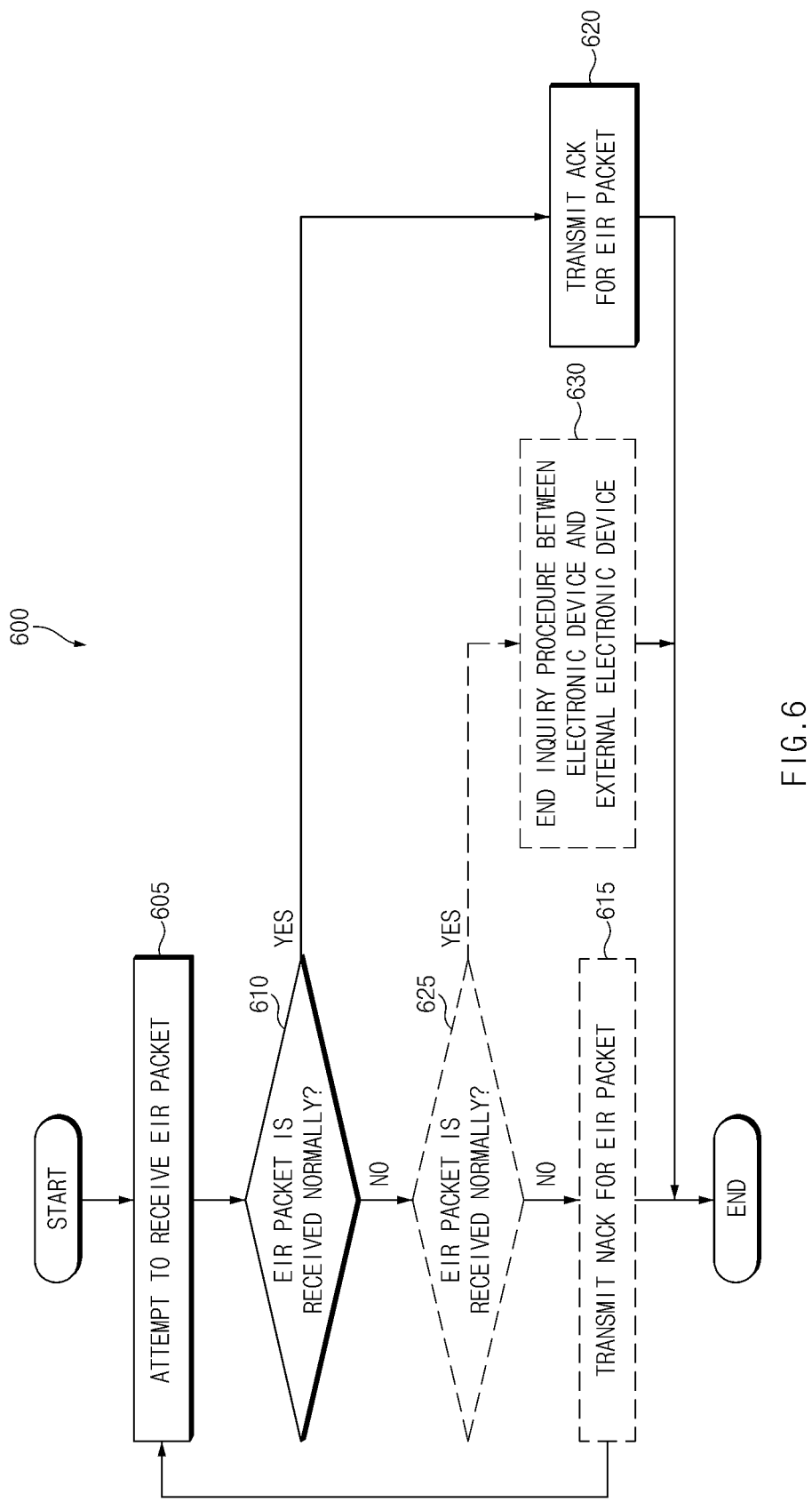
FIG. 6 is a flowchart illustrating an example operation of an electronic device which receives an EIR packet according to various embodiments.

FIG. 6 is a flowchart 600 illustrating an example operation of an electronic device which receives an EIR packet according to various embodiments. The operations illustrated in FIG. 6 may be performed by the first device 201 of FIG. 2. The operations illustrated in FIG. 6 may be performed by an electronic device or a component included in an electronic device. For example, a wireless communication circuit (e.g., at least a portion of the wireless communication module 192 of FIG. 1) included in an electronic device may perform the operations illustrated in FIG. 6.

Referring to FIG. 6, in response to identification (e.g., "YES" in operation 520 of FIG. 5) of an EIR retransmission field included in an FHS packet and indicating retransmission of an EIR packet, the electronic device may attempt to receive an EIR packet transmitted from an external electronic device (e.g., the second device 202 of FIG. 2) through the wireless communication circuit (e.g., at least a portion of the wireless communication module 192 of FIG. 1), in operation 605.

In operation 610, the electronic device may identify whether the EIR packet transmitted from the external electronic device is received normally through the wireless communication circuit. If the EIR packet is received normally, the electronic device, in operation 620, may transmit (e.g., operation 535 of FIG. 5) an ACK signal for the EIR packet to the external electronic device (e.g., the second device 202 of FIG. 2) through the wireless communication circuit. If the EIR packet is not received normally within a specified time, the electronic device may transmit a NACK signal for the EIR packet to the external electronic device through the wireless communication circuit in operation 615. According to an embodiment, the electronic device may not transmit the NACK signal (namely, the electronic device may skip operation 615). In this case, the external electronic device may retransmit the EIR packet in response to non-reception of a response signal for the EIR packet within a specified time. According to an embodiment, the electronic device may repeatedly perform operations 605, 610, and 615 until the EIR packet is received normally.

According to an embodiment, the electronic device may further perform operation 625 in order to inhibit an inquiry procedure from being delayed or inhibit power consumption from increasing due to unlimited retransmission of the EIR packet. In operation 625, the electronic device may identify whether the number of attempts (or time of attempt) to receive the EIR packet is at least a threshold value. According to an embodiment, the threshold value may be determined based on a battery state of the electronic device. According to an embodiment, the threshold value may be determined based on a wireless communication state. For example, the electronic device may determine the threshold value based on a signal strength of a signal (e.g., FHS packet) received from the external electronic device. According to an embodiment, the threshold value may be set by a manufacturer in a design stage of the electronic device. According to an embodiment, the threshold value may be determined by a user setting.

The electronic device may perform operation 615 if the number of attempts (or time of attempt) to receive the EIR packet is less than the threshold value. The electronic device may end an inquiry procedure between the electronic device and the external electronic device in operation 630 if the number of transmissions (or transmission time) of the EIR packet is at least the threshold value.

Figure 7:
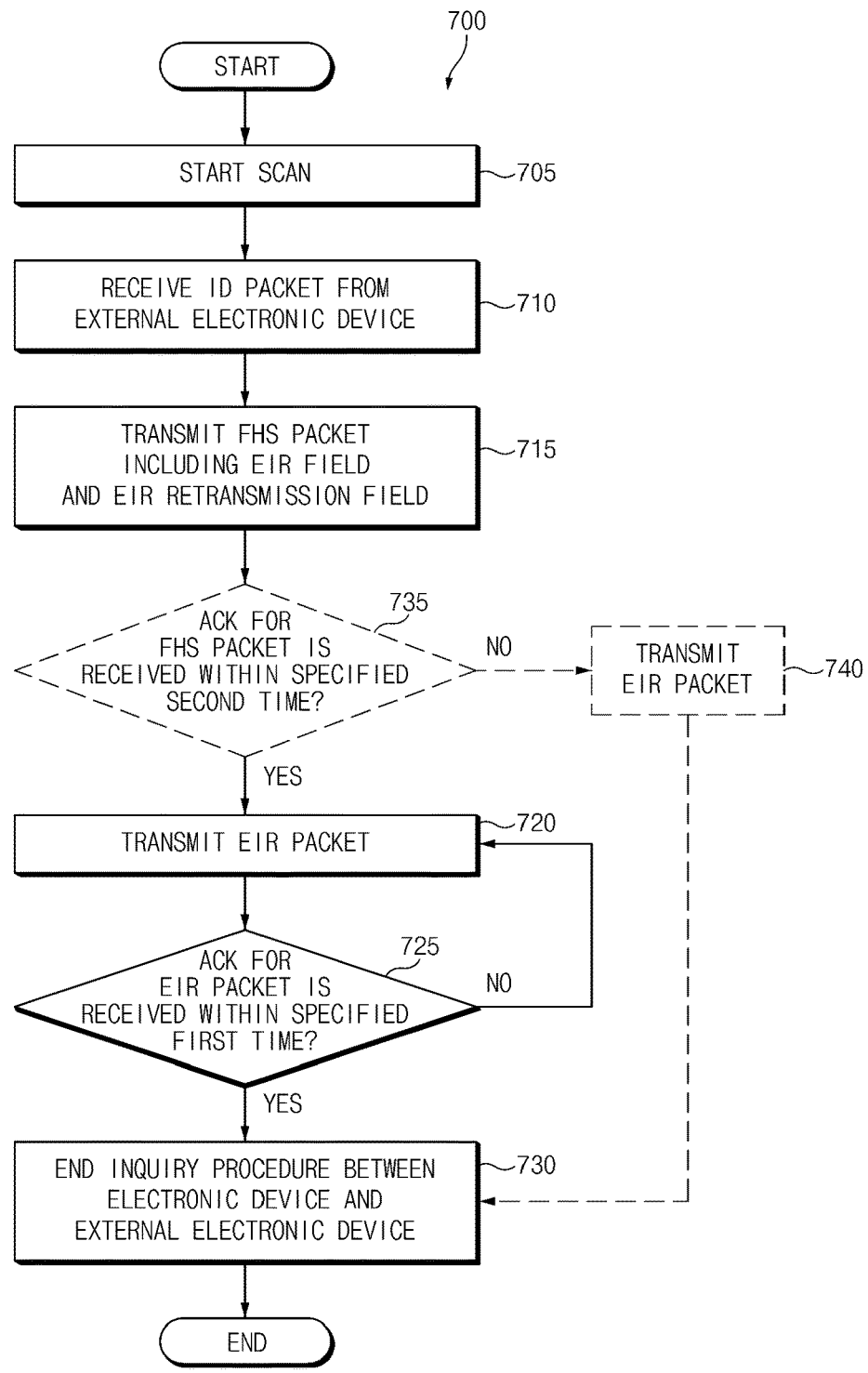
FIG. 7 is a flowchart illustrating an example operation of an electronic device which transmits an EIR packet according to various embodiments.

FIG. 7 is a flowchart 700 illustrating an example operation of an electronic device which transmits an EIR packet according to various embodiments. The operations illustrated in FIG. 7 may be performed by the second device 202 of FIG. 2. The operations illustrated in FIG. 7 may be performed by an electronic device or a component included in an electronic device. For example, a wireless communication circuit (e.g., at least a portion of the wireless communication module 192 of FIG. 1) included in an electronic device may perform the operations illustrated in FIG. 7.

Referring to FIG. 7, in operation 705, an electronic device may start a scan (or inquiry scan) based on a Bluetooth protocol through a wireless communication circuit (e.g., at least a portion of the wireless communication module 192 of FIG. 1).

In operation 710, the electronic device may receive an IAC-based ID packet from an external electronic device (e.g., the first device 201 of FIG. 2) through the wireless communication circuit.

In operation 715, the electronic device may transmit an FHS packet including an EIR field and an EIR retransmission field to the external electronic device through the wireless communication circuit. The EIR field may indicate that the electronic device may transmit an EIR packet. The EIR retransmission field may indicate that the electronic device may retransmit an EIR packet.

In operation 720, the electronic device may transmit an EIR packet to the external electronic device through the wireless communication circuit.

In operation 725, the electronic device may identify whether an ACK signal for the EIR packet is received within a specified first time after transmitting the EIR packet through the wireless communication circuit. The specified first time, for example, may correspond to one time slot (e.g., the fifth slot 415 of FIG. 4A) defined in a Bluetooth standard.

If the ACK signal for the EIR packet is received within the specified first time, the electronic device may end an inquiry procedure between the electronic device and the external electronic device in operation 730.

The electronic device may re-perform operation 720 if the ACK signal for the EIR packet is not received within the specified first time or a NACK signal is received. The electronic device may repeatedly perform operations 720 and 725 until the ACK signal for the EIR packet is received.

According to an embodiment, the electronic device may further include operations 735 and 740. In operation 735, the wireless communication circuit of the electronic device may identify whether an ACK signal for the FHS packet is received within a specified second time after transmitting the FHS packet. The specified second time, for example, may correspond to one time slot (e.g., the third slot 413 of FIG. 4A) defined in a Bluetooth standard. The electronic device may perform operation 720 if the ACK signal for the FHS packet is received within the specified second time.

If the ACK signal for the FHS packet is not received within the specified second time, the electronic device may determine that the external electronic device does not support an operation related to EIR packet retransmission. The electronic device may end an inquiry procedure between the electronic device and the external electronic device without retransmitting the EIR packet (operation 730) after transmitting the EIR packet (operation 740).

Figure 8:
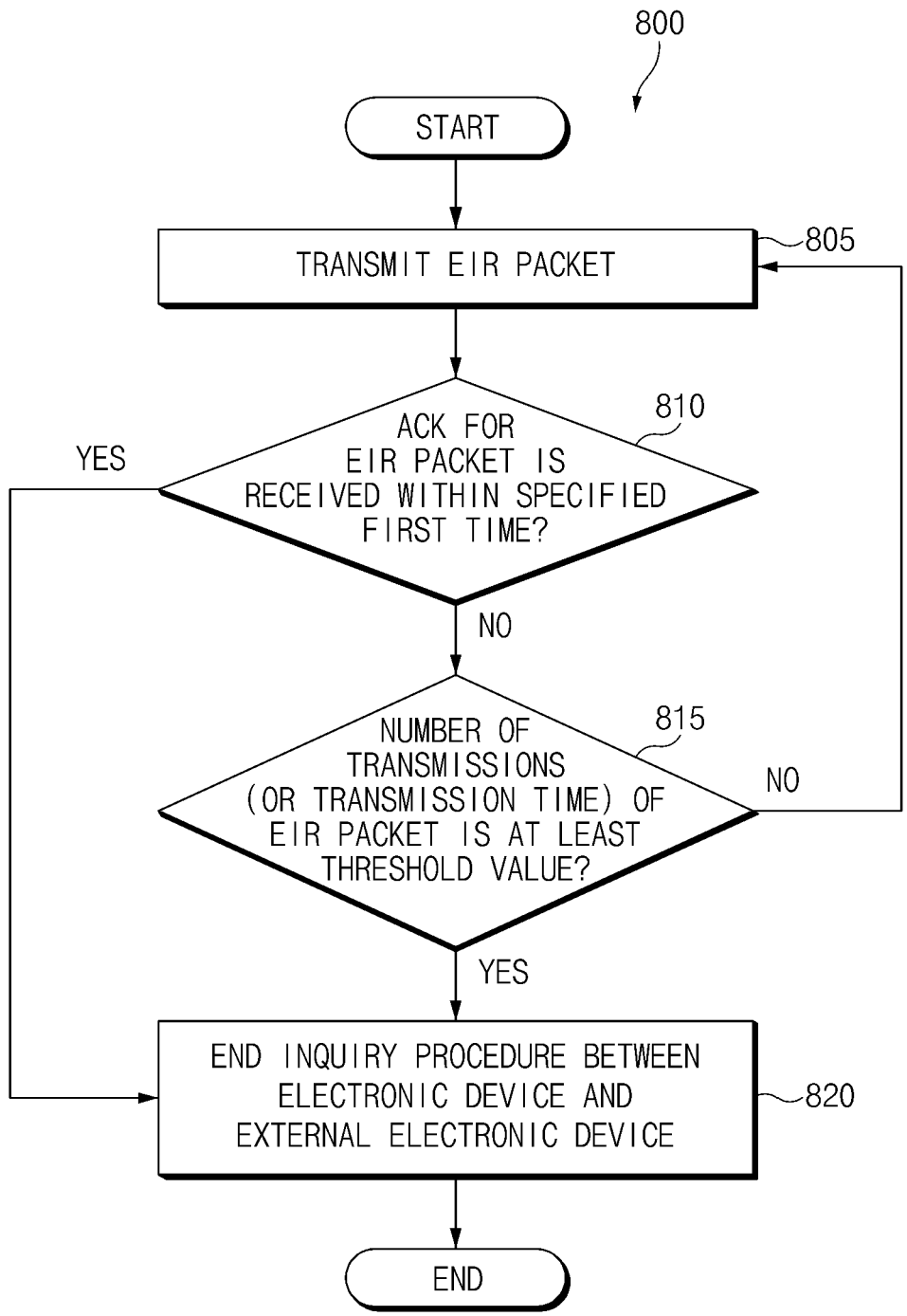
FIG. 8 is a flowchart illustrating an example operation of an electronic device which transmits an EIR packet according to various embodiments.

FIG. 8 is a flowchart illustrating an example operation of an electronic device which transmits an EIR packet according to various embodiments. The operations illustrated in FIG. 8 may be performed by the second device 202 of FIG. 2. The operations illustrated in FIG. 8 may be performed by an electronic device or a component included in an electronic device. For example, a wireless communication circuit (e.g., at least a portion of the wireless communication module 192 of FIG. 1) included in an electronic device may perform the operations illustrated in FIG. 8.

Referring to FIG. 8, in operation 805, the electronic device may transmit (e.g., operation 720 of FIG. 7) an EIR packet to an external electronic device (e.g., the first device 201 of FIG. 2) through the wireless communication circuit (e.g., at least a portion of the wireless communication module 192 of FIG. 1).

In operation 810, the electronic device may identify (e.g., operation 725 of FIG. 7) whether an ACK signal for the EIR packet is received within a specified first time after transmitting the EIR packet through the wireless communication circuit.

If the ACK signal for the EIR packet is received within the specified first time, the electronic device may end (e.g., operation 730 of FIG. 7) an inquiry procedure between the electronic device and the external electronic device in operation 820.

If the ACK signal for the EIR packet is not received within the specified first time or a NACK signal for the EIR packet is received, the electronic device may identify whether the number of transmissions (or transmission time) of the EIR packet through the wireless communication circuit is at least a threshold value in operation 815. According to an embodiment, the threshold value may be determined based on a battery state of the electronic device. According to an embodiment, the threshold value may be determined based on a wireless communication state. For example, the electronic device may determine the threshold value based on a signal strength of a signal (e.g., ID packet or ACK signal) received from the external electronic device. According to an embodiment, the threshold value may be set by a manufacturer in a design stage of the electronic device. According to an embodiment, the threshold value may be determined by a user setting.

The electronic device may re-perform operation 805 if the number of transmissions (or transmission time) of the EIR packet is less than the threshold value. The electronic device may end an inquiry procedure between the electronic device and the external electronic device in operation 820 if the number of transmissions (or transmission time) of the EIR packet is at least the threshold value. According to an embodiment, if the number of transmissions (or transmission time) of the EIR packet is at least the threshold value, the electronic device may provide only a limited service via the external electronic device.

Figure 9:
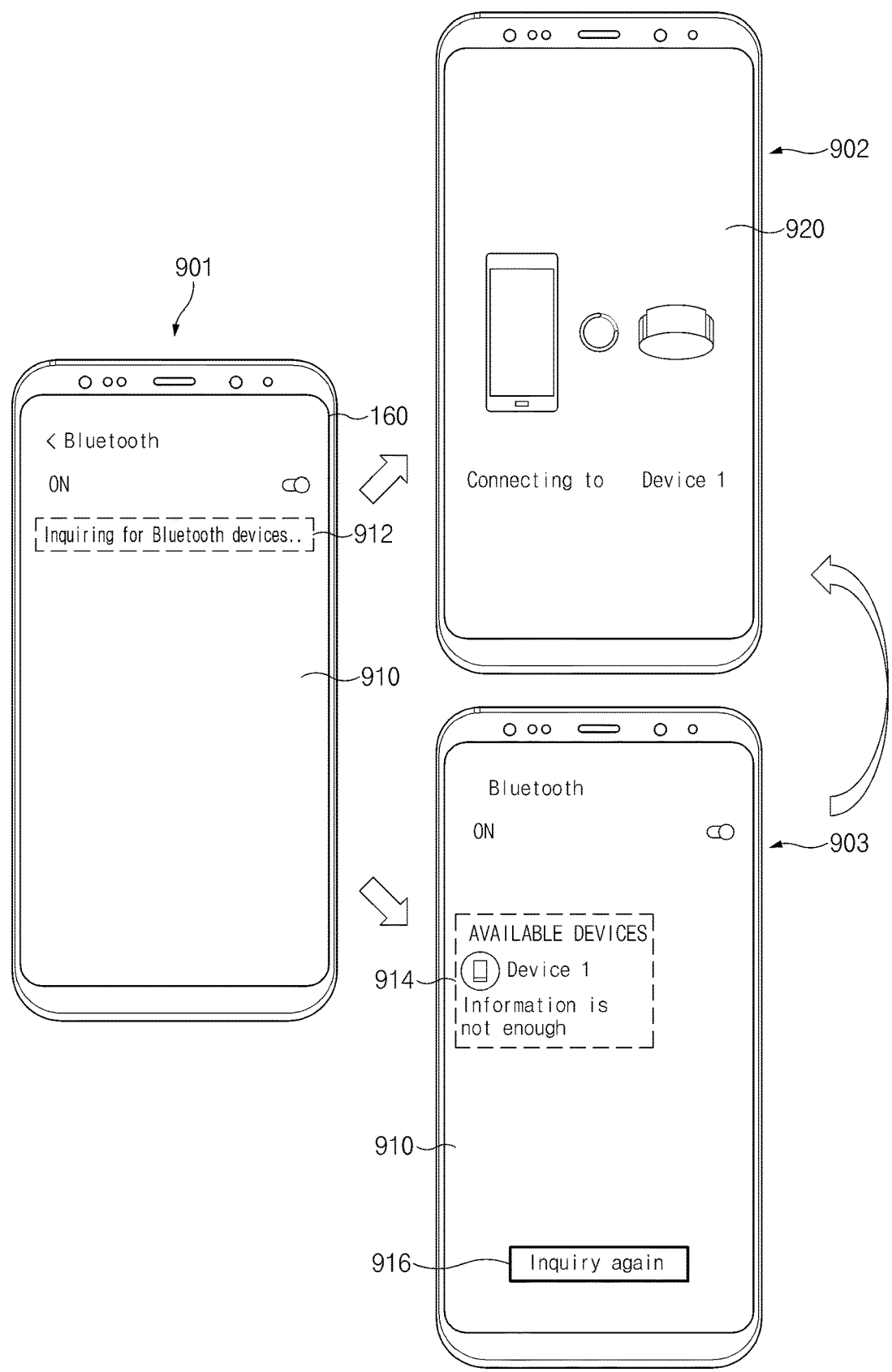
FIG. 9 is a diagram illustrating example user interfaces (UI) showing an inquiry result according to various embodiments.

FIG. 9 is a diagram illustrating example user interfaces (UI) showing an inquiry result according to various embodiments.

Referring to FIG. 9, with regard to reference number 901, an electronic device (e.g., the first device 201 of FIG. 2) may output a first screen 910 through a display device 160 (e.g., display) until an FHS packet or EIR packet is received from an external electronic device (e.g., the second device 202 of FIG. 2). The first screen 910 may be a setting screen for a Bluetooth connection. For example, the first screen 910 may include a text 912 (e.g., "inquiring for Bluetooth devices") indicating that the electronic device is inquiring for an external electronic device.

If the EIR packet is received normally from the external electronic device, the electronic device may connect a service profile with the external electronic device based on data (e.g., manufacturer's data) included in the EIR packet. In this case, the electronic device may output a screen separate from the first screen 910. According to an embodiment, the electronic device may output a separate screen by executing a particular application (e.g., smart watch application) associated with the external electronic device. For example, with regard to reference number 902, the electronic device may output a second screen 920 through the display device 160 based on data (e.g., manufacturer's data) included in the EIR packet. The second screen 920 may be based on screen configuration information included in the EIR packet. For example, if the electronic device and the external electronic device automatically perform an inquiry procedure after the electronic device receives the EIR packet, the second screen 920 may show that the electronic device and the external electronic device are performing a connection procedure based on a service profile. For another example, if the electronic device and the external electronic device complete the connection procedure based on the service profile, the second screen 920 may show a user interface for allowing the user to connect, control, manage, or monitor the external electronic device via the electronic device.

If the EIR packet is not received normally from the external electronic device, the electronic device may fail to connect the service profile with the external electronic device and may connect only a partial profile (e.g., hands-free profile (HPF)). In this case, the electronic device may maintain the first screen 910 without outputting a separate screen. For example, with regard to reference number 903, the electronic device may output, to a partial area 914 of the first screen 910, information indicating that the external electronic device is discovered. If the electronic device and the external electronic device automatically perform a connection procedure without a user input, the first screen 910 may output, to the partial area 914, information indicating that the external electronic device is connected. For example, the electronic device may display, on the partial area 914, a name (e.g., "Device 1") of the external electronic device. Since the EIR packet has not been received normally, the electronic device may display, on the partial area 914, a text (e.g., "information is not enough") indicating insufficient information. According to an embodiment, in order to re-perform an inquiry procedure with the external electronic device in response to a user input, the electronic device may output a first graphic user interface (GUI) 916 including a specified text (e.g., "Inquiry again") to the first screen 910 in order to re-perform an inquiry procedure with the external electronic device in response to a user input. If the user input selecting the first GUI 916 is received, the electronic device may re-perform the inquiry procedure with the external electronic device. If the EIR packet is received normally as a result of re-performing the inquiry procedure, the electronic device may output the second screen 920 as indicated by reference number 902.

As described above, an electronic device (e.g., the first device 201 of FIG. 2A) according to an embodiment of the present disclosure may include: a wireless communication circuit (e.g., at least a portion of the wireless communication module 192 of FIG. 1) configured to support a Bluetooth protocol, wherein the wireless communication circuit may be configured to: transmit an inquiry access code (IAC)-based identification (ID) packet for a communication connection with an external electronic device (e.g., the second device 202 of FIG. 2A); receive a frequency hop synchronization (FHS) packet corresponding to the ID packet from the external electronic device; identify whether an extended inquiry response (EIR) field included in the FHS packet indicates transmission of an EIR packet; identify whether a reserved field included in the FHS packet indicates retransmission of the EIR packet based on the EIR field indicating transmission of the EIR packet; receive the EIR packet from the external electronic device; and transmit an acknowledgement (ACK) signal for reception of the EIR packet in response to reception of the EIR packet.

According to an example embodiment, the wireless communication circuit may be configured to transmit an ACK signal for reception of the FHS packet to the external electronic device after receiving the FHS packet.

According to an example embodiment, the wireless communication circuit may be configured to transmit a negative ACK (NACK) signal to the external electronic device based on the wireless communication circuit failing to receive the EIR packet from the external electronic device within a specified time after receiving the FHS packet.

According to an example embodiment, the wireless communication circuit may be configured to not transmit a response signal for the EIR packet to the external electronic device based on the wireless communication circuit failing to receive the EIR packet from the external electronic device within a specified time after receiving the FHS packet.

According to an example embodiment, the specified time may correspond to a time slot defined by a Bluetooth standard.

According to an example embodiment, the wireless communication circuit may be configured to transmit the ID packet after transmitting the ACK signal for reception of the EIR packet.

According to an example embodiment, the electronic device may further include a processor (e.g., the processor 120 of FIG. 1) operatively connected to the wireless communication circuit and a display (e.g., the display device 160 of FIG. 1) operatively connected to the processor, wherein the processor may be configured to: control the display to output a first screen showing that the external electronic device is being inquired for before the wireless communication circuit receives the EIR packet, and display, a second screen showing that the electronic device is connecting a service profile with the external electronic device based on screen configuration information included in the EIR packet based on the EIR packet being received.

According to an example embodiment, the processor may be configured to: output, to the first screen, information indicating that the external electronic device is discovered based on the wireless communication circuit failing to receive the EIR packet from the external electronic device within a specified time after receiving the FHS packet; control the display to display a graphic user interface (GUI) for re-performing an inquiry procedure on the first screen; and retransmit the ID packet through the wireless communication circuit in response to a user input selecting the GUI.

As described above, an electronic device (e.g., the second device 202 of FIG. 2A) according to an example embodiment of the present disclosure may include: a wireless communication circuit (e.g., at least a portion of the wireless communication module 192 of FIG. 1) configured to support a Bluetooth protocol, wherein the wireless communication circuit may be configured to: perform an inquiry scan to scan for an external electronic device; receive an inquiry access code (IAC)-based identification (ID) packet from the external electronic device (e.g., the first device 201 of FIG. 2A) based on the inquiry scan; transmit, to the external electronic device, a frequency hop synchronization (FHS) packet including an extended inquiry response (EIR) field indicating transmission of an EIR packet and a reserved field indicating retransmission of the EIR packet; transmit the EIR packet to the external electronic device within a first time after transmitting the FHS packet; identify whether an acknowledgement (ACK) signal indicating reception of the EIR packet is received from the external electronic device within a second time after transmitting the EIR packet; and retransmit the EIR packet to the external electronic device based on the electronic device failing to receive the ACK signal within the second time.

According to an example embodiment, the wireless communication circuit may be configured to: receive an ACK signal related to reception of the FHS packet from the external electronic device, and transmit the EIR packet after receiving the ACK signal related to reception of the FHS packet.

According to an example embodiment, the wireless communication circuit may be configured to: identify whether the ACK signal related to reception of the FHS packet is received within a third time from the external electronic device; transmit the EIR packet after identifying that the ACK signal related to reception of the FHS packet is not received within the third time; and not retransmit the EIR packet after transmitting the EIR packet.

According to an example embodiment, the FHS packet may further include an additional field, and the wireless communication circuit may be configured to insert a bit value indicating retransmission of the EIR packet into the additional field.

According to an example embodiment, the wireless communication circuit may be configured to: receive a negative ACK (NACK) signal for the EIR packet from the external electronic device within the second time after transmitting the EIR packet, and retransmit the EIR packet to the external electronic device in response to reception of the NACK signal.

According to an example embodiment, the wireless communication circuit may be configured to: identify whether the number of transmissions or transmission time of the EIR packet is at least a threshold value based on the wireless communication circuit failing to receive the ACK signal within the second time; not retransmit the EIR packet based on the number of transmissions or transmission time of the EIR packet being at least the threshold value; and retransmit the EIR packet based on the number of transmissions or transmission time of the EIR packet being less than the threshold value.

According to an example embodiment, the second time may correspond to a time slot defined by a Bluetooth standard.

As described above, an electronic device (e.g., the first device 201 of FIG. 2A) according to an embodiment of the present disclosure may include: a wireless communication circuit (e.g., at least a portion of the wireless communication module 192 of FIG. 1) configured to support a Bluetooth protocol, a processor (e.g., the processor 120 of FIG. 1) operatively connected to the wireless communication circuit, and a memory (e.g., the memory 130 of FIG. 1) operatively connected to the processor, wherein the memory may store instructions that, when executed, cause the processor to control the wireless communication circuit to: transmit an identification (ID) packet through the wireless communication circuit; receive a frequency hop synchronization (FHS) packet corresponding to the ID packet from an external electronic device; identify whether an EIR field included in the FHS packet indicates transmission of an EIR packet; identify whether an EIR retransmission field included in the FHS packet indicates retransmission of the EIR packet based on the EIR field indicating transmission of the EIR packet; attempt to receive the EIR packet transmitted from the external electronic device based on the EIR field indicating transmission of the EIR packet; and transmit an acknowledgement (ACK) signal responding to reception of the EIR packet based on the EIR retransmission field indicating retransmission of the EIR packet.

According to an example embodiment, the EIR retransmission field may be included at a position at which a reserved field of the FHS packet is inserted or may be included in an additional field of the FHS packet.

According to an example embodiment, the instructions, when executed, may cause the processor to control the wireless communication circuit to: transmit an ACK signal for the FHS packet to the external electronic device, and attempt to receive the EIR packet transmitted from the external electronic device after transmitting the ACK signal for the FHS packet.

According to an example embodiment, the instructions, when executed, may cause the processor to control the wireless communication circuit to: transmit a negative ACK (NACK) signal for the EIR packet or not transmit the ACK signal responding to reception of the EIR packet based on the EIR packet not being received normally through the wireless communication circuit.

According to an example embodiment, the instructions, when executed, may cause the processor to control the wireless communication circuit to: transmit the ID packet after transmitting the ACK signal responding to reception of the EIR packet.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
   wireless communication circuitry configured to support a Bluetooth protocol, wherein the wireless communication circuitry is configured to:
   transmit an inquiry access code (IAC)-based identification (ID) packet for a communication connection with an external electronic device;
   receive a frequency hop synchronization (FHS) packet corresponding to the ID packet from the external electronic device;
   identify whether an extended inquiry response (EIR) field included in the FHS packet indicates transmission of an EIR packet;
   identify whether a reserved field included in the FHS packet indicates retransmission of the EIR packet based on the EIR field indicating transmission of the EIR packet;
   transmit an ACK signal for reception of the FHS packet to the external electronic device after receiving the FHS packet;
   receive the EIR packet from the external electronic device; and
   transmit an acknowledgement (ACK) signal for reception of the EIR packet in response to reception of the EIR packet.

2. The electronic device of claim 1, wherein the wireless communication circuitry is configured to transmit a negative ACK (NACK) signal to the external electronic device based on the wireless communication circuitry failing to receive the EIR packet from the external electronic device within a specified time after receiving the FHS packet.

3. The electronic device of claim 1, wherein the wireless communication circuitry is configured to not transmit a response signal for the EIR packet to the external electronic device based on the wireless communication circuitry failing to receive the EIR packet from the external electronic device within a specified time after receiving the FHS packet.

4. The electronic device of claim 2, wherein the specified time corresponds to a time slot defined by a Bluetooth standard.

5. The electronic device of claim 1, wherein the wireless communication circuitry is configured to transmit the ID packet after transmitting the ACK signal for reception of the EIR packet.

6. The electronic device of claim 1, further comprising:
a processor operatively connected to the wireless communication circuitry; and
a display operatively connected to the processor,
wherein the processor is configured to control the display to:
output a first screen showing that the external electronic device is being inquired for before the wireless communication circuitry receives the EIR packet, and
output a second screen showing that the electronic device is connecting a service profile with the external electronic device based on screen configuration information included in the EIR packet based on the EIR packet being received.

7. The electronic device of claim 6, wherein the processor is configured to:
control the display to output, to the first screen, information indicating that the external electronic device is discovered based on the wireless communication circuitry failing to receive the EIR packet from the external electronic device within a specified time after receiving the FHS packet;
control the display to display a graphic user interface (GUI) for re-performing an inquiry procedure on the first screen through the display; and
control the wireless communication circuitry to retransmit the ID packet in response to receiving an input selecting the GUI.

8. An electronic device comprising:
wireless communication circuitry configured to support a Bluetooth protocol,
wherein the wireless communication circuitry is configured to:
perform an inquiry scan to scan for an external electronic device;
receive an inquiry access code (IAC)-based identification (ID) packet from the external electronic device based on the inquiry scan;
transmit, to the external electronic device, a frequency hop synchronization (FHS) packet including an extended inquiry response (EIR) field indicating transmission of an EIR packet and a reserved field indicating retransmission of the EIR packet;
transmit the EIR packet to the external electronic device within a first time after transmitting the FHS packet;
identify whether an acknowledgement (ACK) signal indicating reception of the EIR packet is received from the external electronic device within a second time after transmitting the EIR packet; and
retransmit the EIR packet to the external electronic device based on the electronic device failing to receive the ACK signal within the second time.

9. The electronic device of claim 8, wherein the wireless communication circuitry is configured to:
receive an ACK signal related to reception of the FHS packet from the external electronic device; and
transmit the EIR packet after receiving the ACK signal related to reception of the FHS packet.

10. The electronic device of claim 9, wherein the wireless communication circuitry is configured to:
identify whether the ACK signal related to reception of the FHS packet is received within a third time from the external electronic device;
transmit the EIR packet after identifying that the ACK signal related to reception of the FHS packet is not received within the third time; and
not retransmit the EIR packet after transmitting the EIR packet.

11. The electronic device of claim 8,
wherein the FHS packet further includes an additional field, and
wherein the wireless communication circuitry is configured to insert a bit value indicating retransmission of the EIR packet into the additional field.

12. The electronic device of claim 8, wherein the wireless communication circuitry is configured to:
receive a negative ACK (NACK) signal for the EIR packet from the external electronic device within the second time after transmitting the EIR packet; and
retransmit the EIR packet to the external electronic device in response to reception of the NACK signal.

13. The electronic device of claim 8, wherein the wireless communication circuitry is configured to:
identify whether a number of transmissions or transmission time of the EIR packet is at least a threshold value based on the wireless communication circuitry failing to receive the ACK signal within the second time;
not retransmit the EIR packet based on the number of transmissions or transmission time of the EIR packet being at least the threshold value; and
retransmit the EIR packet based on the number of transmissions or transmission time of the EIR packet being less than the threshold value.

14. The electronic device of claim 8, wherein the second time corresponds to a time slot defined by a Bluetooth standard.

* * * * *